United States Patent

Bowen et al.

[11] Patent Number: 5,035,045
[45] Date of Patent: Jul. 30, 1991

[54] METHOD OF JOINING BIPOLAR BATTERY FRAMES

[75] Inventors: Gerald K. Bowen, Cedarburg; Michael D. Eskra, Fredonia; David C. Belongia, West Bend, all of Wis.

[73] Assignee: Globe-Union Inc., Milwaukee, Wis.

[21] Appl. No.: 579,615

[22] Filed: Sep. 10, 1990

[51] Int. Cl.$^5$ .............................................. H01M 6/00
[52] U.S. Cl. .................................... 29/623.2; 29/730; 156/308.2; 429/210
[58] Field of Search .................... 29/623.1, 623.2, 730; 156/308.2, 309.9, 322, 304.1, 304.5, 304.6, 272.2; 428/192; 429/210

[56] References Cited

U.S. PATENT DOCUMENTS

| | | | |
|---|---|---|---|
| 3,544,407 | 12/1970 | Rochla | 156/308.2 X |
| 4,068,047 | 1/1978 | Dangel et al. | 429/142 |
| 4,086,119 | 4/1978 | Vecchiotti | 428/192 X |
| 4,390,384 | 6/1983 | Turner | 156/308.2 X |
| 4,737,404 | 4/1988 | Jackson | 156/308.2 X |

Primary Examiner—Anthony Skapars
Attorney, Agent, or Firm—Andrus, Sceales, Starke & Sawall

[57] ABSTRACT

A method of joining thermoplastic frames of a bipolar battery to form a leak-free battery stack. The battery includes a stack of generally rectangular thermoplastic frames, including a series of central frames and a pair of end frames. Each central frame has an opening and a bipolar plate, consisting of a positive electrode and a negative electrode, separated by an electrically conductive substrate, is mounted across the opening. The opposed surfaces of the frame project outwardly beyond the bipolar plate. To join the frames together, a pair of frames is mounted in spaced relation and a pair of back-to-back focused infrared heaters are positioned in the space between the frames and the focal point of each heater is directed into registry with the surface of the respective frame to melt or fuse the surface. The heating unit is then withdrawn and the frames are moved into contact with each other to weld the fused surfaces together.

16 Claims, 2 Drawing Sheets

METHOD OF JOINING BIPOLAR BATTERY FRAMES

BACKGROUND OF THE INVENTION

In a typical lead acid battery, the cell is composed of a lead negative electrode and a lead oxide positive electrode, together with a sulfuric acid electrolyte. When the electrodes are positioned on opposite sides of an electrically conductive substrate, the assembly is referred to as a bipolar plate. The electrical interconnection between cells in a bipolar battery is provided by the substrate whereas in a conventional monopolar battery the electrical interconnection is made by intercell welding of lead straps.

A bipolar battery has advantages in power capability, volume and weight over a conventional monopolar design. The advantages are achieved primarily because of the shorter current path, from which the battery internal resistance is lowered, and the elimination of the lead straps and the use of lightweight substrates, both of which lower the weight of the battery.

In practice, a bipolar battery consists of a stack of generally rectangular non-metallic frames formed of thermoplastic material, including a pair of end frames and a series of central frames. Each central frame is provided with an opening and a bipolar plate is mounted in each opening with opposed surfaces of the frame projecting outwardly beyond the bipolar plate. The frames are secured in contiguous flatwise relation and a separator layer, formed of a material such as glass mat, separates the bipolar plates of the frames. The sealed stack is subsequently filled with an electrolyte, such as sulfuric acid.

A problem encountered in the past with bipolar batteries has been leakage of the acid between the frames, due to a defective seal between the frames. Acid wetting between frames results in shorting between cells and causes high self-discharge of the battery. The battery service life decreases when self-discharge is present due to the poor seals between cells.

In the past, the thermoplastic frames of the bipolar battery have been joined by heat sealing techniques in which a heated platen, at a temperature of above 700° F., is brought into contact with the surfaces of the frames to fuse or melt the surfaces. The fused surfaces are then brought into contact to provide the connection. the conventional bipolar battery frame is relatively thin, having a thickness in the neighborhood of about 0.050 inch, and the thermoplastic material is normally reinforced with glass or graphite fibers. When the thermoplastic material is heated through use of a platen, the fibrous reinforcement can be exposed with the result that an inadequate bond is achieved between the two thermoplastic frames. In addition, as the frames are relatively thin, the high temperature platen heating can cause warpage of the frames.

A further problem encountered during platen heating is that when the heated platen is withdrawn from the thermoplastic frame, molten plastic may pull away from the frame in the form of fine strings. The strings will chill or solidify before the surface of the frame, and as a result, will not provide an adequate bond. The chilled strings can cause leak paths between the frames and can also interfere with the fill channels which are formed in the surface of the frame and are employed when the battery is filled with acid. Therefore, there has been a need for a procedure for joining the thermoplastic bipolar battery frames which will provide a positive leakproof connection.

SUMMARY OF THE INVENTION

The invention is directed to a bipolar battery construction and in particular to a method of joining the thermoplastic frames of the battery.

The bipolar battery includes a stack of side-by-side thermoplastic frames, including a series of central frames and a pair of end frames. Each central frame is provided with an opening and a bipolar plate, composed of a lead negative electrode and a lead oxide positive electrode separated by an electrically conductive substrate, is secured to each frame and encloses the opening. The opposed surfaces of the frame project outwardly beyond the plate.

To join the frames, a pair of frames are mounted in spaced relation in fixtures. A pair of back-to-back infrared lamps mounted in parabolic elliptical reflectors are moved into the space, with each lamp facing one of said frames. The high intensity light beam of each lamp is focused by the parabolic reflector to a narrow beam, having a width in the range of about 1/16 to ⅛ inch, and each focused beam is directed against the surface of the respective frame. The heating unit is reciprocated across the surfaces of each frame and optical sensors can be employed to sense the temperature of the heated surfaces. When the temperature of the surfaces has reached a predetermined value, the heating unit is withdrawn from the space between the frames and the frames are moved together to bring the fused surfaces into contact and provide a welded joint.

With the method of the invention, uniformly heated surfaces are provided, with the surfaces being heated to a depth in the range of about 0.002 to 0.003 inch. When the fused surfaces are brought into contact, a positive, leakproof joint is provided without the formation of strings of plastic material, as can occur when using heated platens. As plastic strings are eliminated, leak paths will not be formed in the fused joint and the fill channels in the frames will not be disrupted.

Other objects and advantages will appear in the course of the following description.

DESCRIPTION OF THE DRAWINGS

The drawings illustrate the best mode presently contemplated of carrying out the invention.

In the invention.

DESCRIPTION OF THE ILLUSTRATED EMBODIMENT

The invention is directed to a bipolar battery construction and more particularly to a method of joining the thermoplastic frames of the battery.

Figure 1:
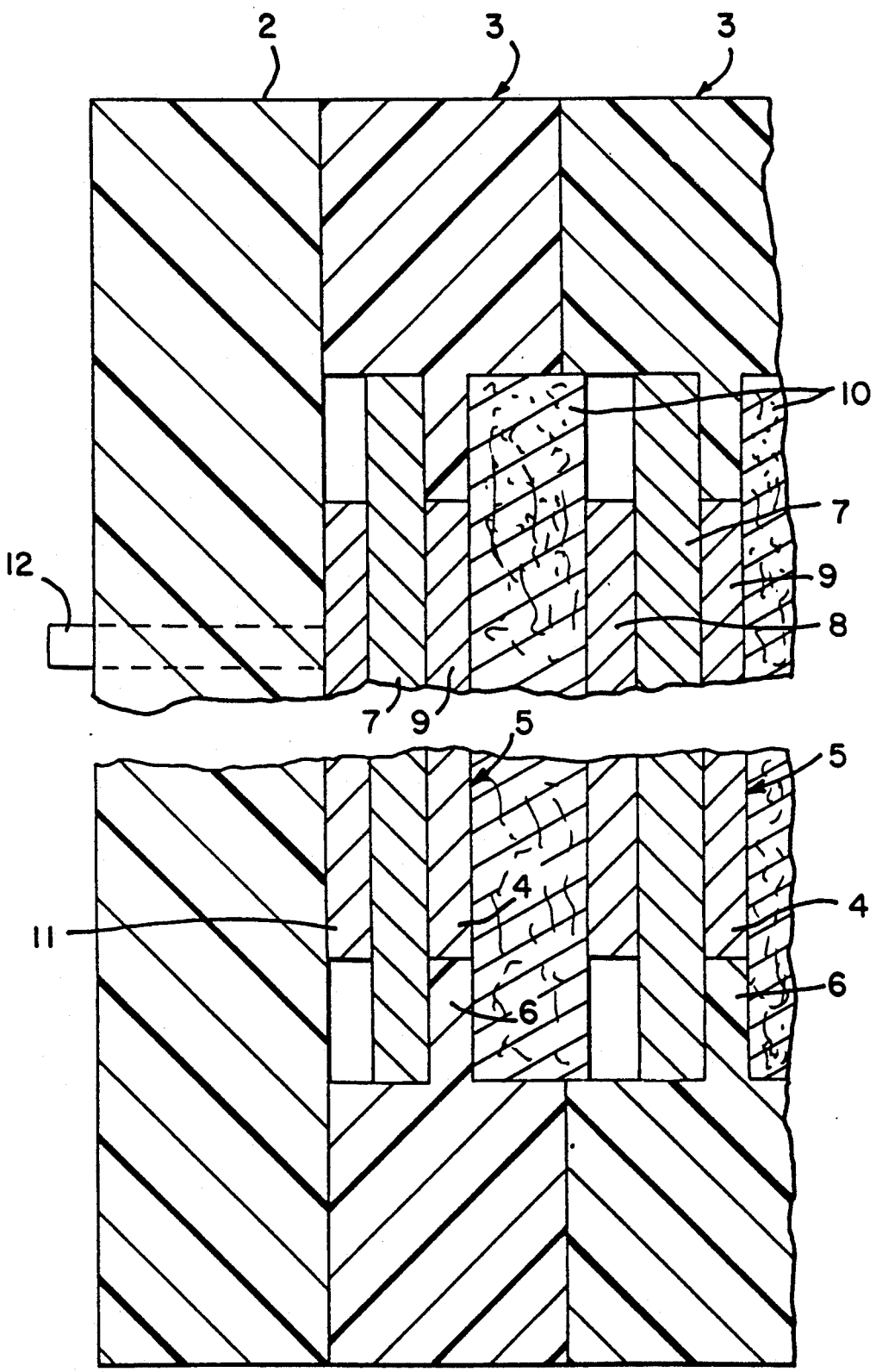
FIG. 1 is fragmentary transverse section of a bipolar battery constructed in accordance with the invention.

The battery is formed of a side-by-side stack of thermoplastic frames, including a pair of end frames 2 (only one of which is shown in FIG. 1), and a series of central frames 3 which are positioned between the end frames. The frames 2 and 3 are relatively thin, having a thickness generally of about 0.050 inch.

Frames 2 and 3 are formed of a thermoplastic resin, such as polyethylene, polypropylene, or the like, and in most instances, the thermoplastic material is reinforced by fibers of carbon, graphite, glass, or the like. The fiber reinforcement can comprise up to 30% by weight of the composite frame.

Frames 2 and 3 are preferably rectangular in shape and each central frame 3 is provided with central opening 4. A conventional bipolar plate 5 is secured across each opening 4.

As shown in FIG. 1, central frame 3 is provided with a flange 6, which borders opening 4 and the electrically conductive substrate 7 of bipolar plate 5 is secured to a side of the flange 6.

Bipolar plate 5 includes substrate 7 and a lead negative electrode 8 and a lead oxide positive electrode 9, are located on opposite sides of substrate 7. Substrate 7 is formed of a material which is insoluble and stable to the sulfuric acid electrolyte, exhibits stability at the lead oxide and lead electrochemical potentials, and is impervious to the electrolyte. It has been found that a polymeric resin such as polyethylene or polypropylene, impregnated with a conductive filler, such as carbon powder, $SnO_2$ powder, or carbon fiber, can be employed as the substrate 7 in the bipolar plate 5. The construction of the bipolar plate 5 is conventional and in itself forms no part of the present invention.

Plates 5 of each frame 3 are separated by a layer of electrical insulating material, such as glass fiber mat 10. End frames 2 are solid and provide rigidity for the stack and protect the termination interface.

As the end plates are not bipolar plates, terminal current collectors 11 are located at the ends of the stack, between the substrate 7 of the last central frame 3 of the series and the adjacent end frame 2. Collectors 11 are connected to the respective negative and positive terminals. Only negative terminal 12 is shown in FIG. 1.

After assembly, the stack of frames is then filled with an electrolyte, such as sulfuric acid, which impregnates the separator layers 10. As previously noted, substrate layers 7 are impervious to the electrolyte.

Figure 2:
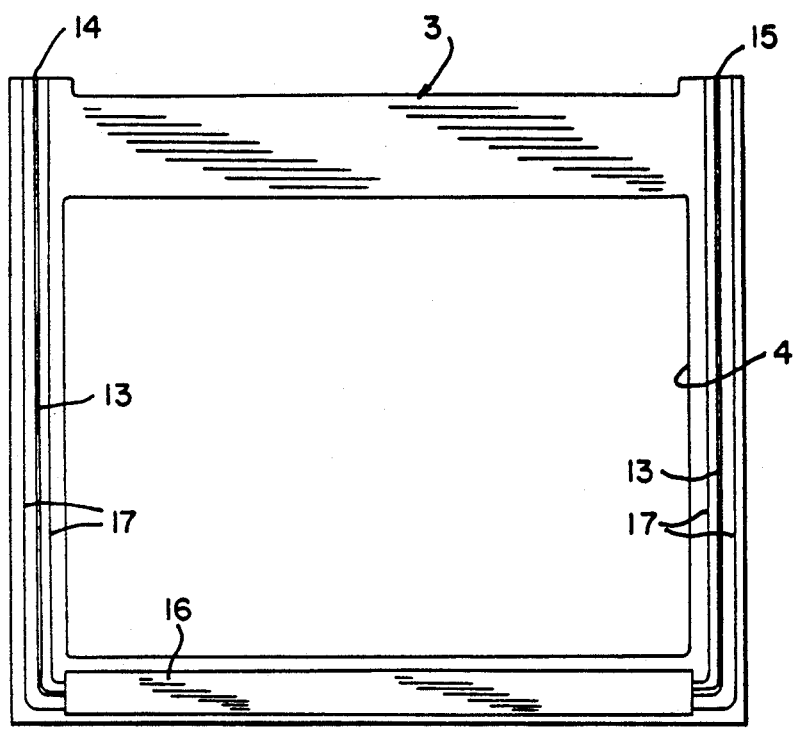
FIG. 2 is a front elevation of a frame.

To aid in filling with acid, one surface of each central frame 3 is provided with a fill channel 13. As shown in FIG. 2, fill channel 13 is U-shaped, having a pair of open ends 14 and 15. The central portion of channel 13 located along the bottom of the frame is enlarged in cross section, as indicated by 16. During filling, acid is introduced into one end, such a 14, of each channel 13, while air will be vented from the opposite end 15. After filling, one of the ends, such as 15, is sealed, while a standard pressure relief valve mechanism is installed in the opposite end of each channel.

Figure 3:
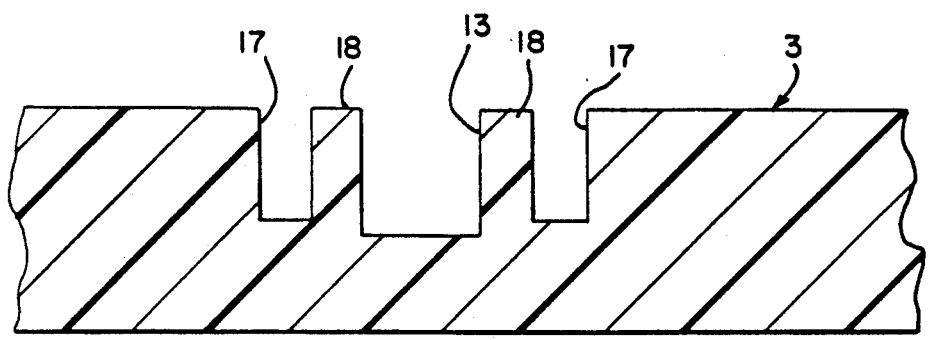
FIG. 3 is a section taken along line 3—3 of FIG. 2.

As shown in FIG. 3, a pair of flash trap channels 17 is formed in the surface of frame 3 on either side of channel 13. When two of the frames are joined together, as will be hereinafter described, molten or fused thermoplastic material may be displaced and any such displaced thermoplastic material will be collected in the trap channels 17 and will not clog the fill channel 13. Trap channels 17 are separated from the fill channel 13 by ridges 18.

Figure 4:
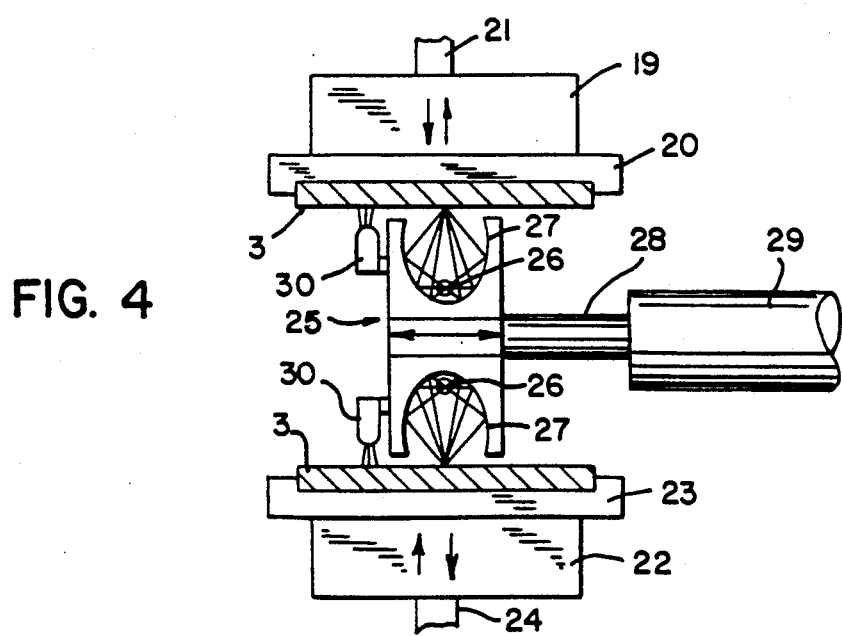
FIG. 4 is a schematic representation of the apparatus for joining the frames of the battery.

In accordance with the invention, the thermoplastic frames 2,3 are joined together by use of focused infrared heating units and FIG. 4 shows the construction of the heating units in schematic form. The construction includes an upper platen 19 mounted for vertical movement and carries a fixture 20. One of the frames, such as 3, is mounted in fixture 20, with the surface of the frame projecting outwardly of the fixture. Platen 19 can be raised and lowered through operation of a conventional fluid cylinder 21, such as a hydraulic or pneumatic type.

A lower platen 22 is also mounted for vertical movement and carries a fixture 23. A second frame 3 is mounted in fixture 23 with the upper surface of the frame projecting upwardly of the fixture.

An indexing cylinder 24 is connected to lower platen 23 and is adapted to index the platen 23 downwardly in a series of steps of increments.

An infrared heating unit 25 is mounted to be moved into the space between the frames carried by fixtures 20 and 23. Heating unit 25 includes a pair of back-to-back quartz, infrared lamps 26 each of which is mounted in a parabolic elliptical reflector 27 having a specular finish. The use of the quartz lamp 26 in combination with the reflector 27 creates a narrow focused beam having a width generally in the range of about 1/16 to ⅛ inch and capable of producing a surface temperature up to 1200° F. or more. The heating wave length of the lamp 26 is approximately 1.1 microns of visible light.

Heating unit 25 is mounted for reciprocating movement between the fixtures 20 and 23, and as illustrates in FIG. 4, this movement can be accomplished by mounting the heating unit on a ram 28 of a fluid cylinder 29. Through operation of the cylinder 29, the heating unit 25 can be introduced into the space between the fixtures 21 and 24, and withdrawn therefrom.

It is important that the focused infrared heating lamps 26 continuously move across the surface of the frames 2,3 to be heated. Due to the high temperatures, the resin matrix could burn or combust if the lamps were stationary. Any desired mechanism can be employed to reciprocate or move the lamps relative to the surfaces of the frames to be heated. This can be accomplished by reciprocating operation of the cylinder 29. During reciprocation, the surface temperature of the frames 2,3 will increase with each stroke. As the thermoplastic material has a relatively low coefficient of heat conductivity, during each brief cooling phase, heat will be radiated away from the surface to the air, rather than to the interior layers of the thermoplastic frame. Thus, the internal temperature of the frame will remain virtually unaffected, while the surface temperature increases to fusion level. In practice, the energy supplied to the infrared lamps, the time cycle, the rate of reciprocation, and the distance of the surface from the focal point of the lamps 26 are all correlated to provide a depth of fusion or penetration in the range of about 0.002 to 0.003 inch. In practice, the surface of the frame 2,3 is normally maintained at the focal point of the respective lamp.

Optical sensors 30 can be employed to control the heating cycle. As shown in FIG. 4, a sensor 30 is mounted on each reflector 27 and each sensor will sense the temperature of the frame surface being heated. Sensors 30 can be programmed to control or throttle the intensity of each lamp 26 until the fused surface of each frame has reached the desired temperature. At this point the sensors 30 can generate a signal to operate cylinder 29 and withdraw the heating unit 26 from between the fixtures 20,23 and to operate upper cylinder 21 to move the upper platen 19 downwardly to bring the frame 3 mounted in fixture 20 into engagement with the frame mounted on fixture 23. This pressure will cause the opposed fused or molten surfaces of the two frames to bond or weld together to provide a leakproof joint.

In assembling the battery, one of the end frames 2 is mounted in the lower fixture 23, while a central frame 3, carrying the bipolar plate 5, is secured to the fixture 20 of the upper platen 19. With the frames 2,3 mounted in the platens, the heating unit 25 is then moved into the open press area between the platens and the horizontal reciprocation is commenced over the surfaces of the frames. When the surfaces have been heated to the desired temperature, as determined by sensors 30, the heating unit 25 is withdrawn from the press area and the upper platen 19 is moved downwardly, bringing the fused surface of frame 3 into contact with the fused surface of end frame 2 mounted on fixture 23. After the two frames have been joined, the upper platen 19 is elevated to its original position, and the lower platen 22 is indexed downwardly, thus lowering the partial stack of joined frames. A second central frame 3, carrying a plate 5, is then mounted in the fixture 20 of the upper platen 19 and the procedure is repeated to join the second frame 3 to the frame 3 of the partially assembled stack held by the lower platen 22. The With the use of the focused infrared heat, the focused beam can be precisely positioned on the surface of the frames. As the bipolar plate 5 is recessed or offset from the frame surfaces, the plate 5 will not lie in the reciprocating plane of the focused beam, and thus the plate will not be heated to a temperature which would adversely effect its operation. Even though the temperature may approach 1200° F. at the focal point, the frames 2,3 will only be heated to a temperature in the neighborhood of about 350° F. to 700° F. depending on the reciprocating rate, the time cycle, the power input, and the distance from the focused beam. The bipolar plates 5 being displaced further from the focal point will thus be heated only to a lower temperature which will not adversely effect the performance of the plates. Alternately, a layer of heat insulating material, not shown, can be applied over the opposed surfaces of bipolar plate 5 to shield the plate from the heat of the lamps 26, and then removed before the frames are brought together.

The invention provides a positive leak-proof bond between the thermoplastic frames of a bipolar battery which eliminates the problems encountered when using platen-type heating.

Various modes of carrying out the invention are contemplated as being within the scope of the following claims particularly pointing out and distinctly claiming the subject matter which is regarded as the invention.

We claim:

1. A method of joining thermoplastic bipolar battery frames, comprising the steps of forming a plurality of generally rectangular bipolar battery frames of thermoplastic material and forming a central opening in each frame, mounting a bipolar plate in the opening of each frame with said plate having a lesser thickness than said frame so that opposed surfaces of said frame project outwardly beyond said plate, positioning a pair of frames in spaced relation, moving a pair of back-to-back focused infrared heaters into the space and disposing a focused beam of each heater into registry with the surface of one of the frames to thereby heat and fuse a layer of said opposed surfaces, withdrawing the heaters from said space, and moving the fused opposed surfaces into contacting relation to bond the surfaces together.

2. The method of claim 1, and including the step of forming a shoulder in each frame bordering said opening, and mounting said plate against said shoulder.

3. The battery of claim 1, and including the step of maintaining said focused beam out of registry with said plate.

4. The method of claim 1, and including the step of continuously moving said beam along the surface of the respective frame.

5. The method of claim 1, and including the step of sensing the temperature of the fused surfaces, and withdrawing said heating unit when the temperatures of each fused surface reaches a predetermined value.

6. A method of joining thermoplastic bipolar battery frames, comprising the steps of forming a plurality of generally rectangular bipolar battery frames of thermoplastic material and forming a central opening in each frame, mounting a bipolar plate in each opening, said plate having a lesser thickness than the corresponding frame so that opposed surfaces of said frame project outwardly beyond said plate, position a pair of frames in spaced relation, positioning an infrared lamp in facing relation with respect to a surface of each frame, and focusing a light beam from each lamp at an elongated focal point, disposing the focal point of each lamp into registry with a surface of one of said frames to thereby heat and fuse said surface, and thereafter moving the fused surfaces into contacting relation to weld the frames together and form a partial stack.

7. The method of claim 6, and including the steps of positioning a third frame in spaced relation with respect to a frame of said partial stack and repeating the steps to weld said third frame to said partial stack.

8. The method of claim 6, and including the step of sensing the temperature of the fused surfaces of said frames, and withdrawing said lamps when said temperatures reach a predetermined value.

9. The method of claim 6, and including the step of continuously moving the focal point of each lamp across the surface of the respective frame.

10. A method of joining thermoplastic bipolar battery frames, comprising the steps of forming a pair of impervious end frames of thermoplastic material, forming a plurality of central frames of thermoplastic material and forming a central opening in each frame, mounting a bipolar plate in the opening of each central frame, said bipolar plate having a lesser thickness than the central frame so that opposed surfaces of said central frame project outwardly beyond said plate, positioning an end frame and a central frame in spaced relation, moving a pair of back-to-back focused infrared heaters into said space and disposing an elongated focused beam of each heater into registry with a surface of on of the frames to thereby heat and fuse the surface, withdrawing said heating unit from said space, and moving the fused surfaces into contacting relation to weld said end frame to said central frame and provide a partial stack.

11. The method of claim 10, and including the step of positioning a second central frame in spaced relation to the first central frame of said partial stack, moving a pair of back-to-back focused infrared heaters into the space and disposing an elongated focused beam of each heater into registry with a surface of the respective central frames to thereby heat and fuse the surfaces, withdrawing the heaters from the space, and moving the fused surface of the second central frame into contact with the fused surface of the first central frame to provide an enlarged stack.

12. The method of claim 10, and including the step of continuously reciprocating the focused beam across the respective surfaces of the frames.

13. The method of claim 12, wherein the step of reciprocating the focused beam comprises reciprocating the beam in a direction transverse to the elongation of said beam.

14. The method of claim 1, and including the step of providing a heat insulating shield over said plate to insulate said battery plate from the heat of said infrared heater.

15. The method of claim 1, and including the step of forming a fill channel in a surface of said frame, said fill channel having a pair of open ends located at the upper end of said frame, and forming a flash trap channel on at least one side of said fill channel to collect any molten plastic displaced when said frames are brought into contacting relation.

16. The method of claim 1, and including the step of exerting an external force against said frames to force said fused surfaces into tight contacting relation.

* * * * *

UNITED STATES PATENT AND TRADEMARK OFFICE
CERTIFICATE OF CORRECTION

PATENT NO. : 5,035,045

DATED : July 30, 1991

INVENTOR(S) : GERALD K. BOWEN ET AL

It is certified that error appears in the above-identified patent and that said Letters Patent is hereby corrected as shown below:

Col. 6, Line 50, CLAIM 10, Delete "on" and substitute therefor --one--

Signed and Sealed this

Thirtieth Day of March, 1993

Attest:

STEPHEN G. KUNIN

*Attesting Officer*    Acting Commissioner of Patents and Trademarks